United States Patent
Romero

(10) Patent No.: US 6,688,654 B2
(45) Date of Patent: Feb. 10, 2004

(54) ONE PIECE QUICK CONNECTOR

(75) Inventor: Oscar Romero, Granada Hills, CA (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/732,562

(22) Filed: Dec. 8, 2000

(65) Prior Publication Data

US 2002/0070549 A1 Jun. 13, 2002

(51) Int. Cl.[7] ................................................ F16L 37/00
(52) U.S. Cl. ....................... 285/308; 285/313; 285/319; 285/921
(58) Field of Search ................................ 285/308, 313, 285/91, 319, 921, 81

(56) References Cited

U.S. PATENT DOCUMENTS

| | | | |
|---|---|---|---|
| 4,123,091 A | * 10/1978 | Cosentino et al. | 285/319 |
| 4,673,200 A | 6/1987 | Miyauchi | |
| 4,743,051 A | 5/1988 | Proni | |
| 4,844,512 A | * 7/1989 | Gahwiler | 285/921 X |
| 4,923,228 A | 5/1990 | Laipply | |
| 4,943,091 A | 7/1990 | Bartholomew | |
| 4,969,879 A | 11/1990 | Lichte | |
| 4,991,882 A | * 2/1991 | Gahwiler | 285/319 X |
| 5,002,315 A | 3/1991 | Bartholomew | |
| 5,213,376 A | * 5/1993 | Szabo | 285/921 |
| 5,324,080 A | 6/1994 | McNaughton et al. | |
| 5,366,259 A | * 11/1994 | Hohmann et al. | 285/305 |
| 5,374,088 A | * 12/1994 | Moretti et al. | 285/305 |
| 5,401,063 A | * 3/1995 | Plosz | 285/81 |
| 5,462,313 A | 10/1995 | Rea et al. | |
| 5,466,017 A | * 11/1995 | Szabo et al. | 285/319 |
| 5,520,420 A | * 5/1996 | Moretti | 285/308 X |
| 5,626,371 A | 5/1997 | Bartholomew | |
| 5,716,081 A | 2/1998 | Leigh-Monstevens et al. | |
| 5,772,263 A | 6/1998 | Lewis | |
| 5,799,986 A | 9/1998 | Corbett et al. | |
| 5,882,047 A | * 3/1999 | Ostrander et al. | 285/319 |
| 5,915,738 A | 6/1999 | Guest | |
| 5,924,746 A | 7/1999 | Fixemer | |
| 5,992,895 A | * 11/1999 | Steinkamp | 285/319 |
| 6,082,779 A | * 7/2000 | Lesser et al. | 285/319 X |
| 6,086,119 A | * 7/2000 | Hansel | 285/309 |

* cited by examiner

Primary Examiner—David Bochna
(74) Attorney, Agent, or Firm—Richard J. Veltman; John D. Del Ponti

(57) ABSTRACT

A one-piece quick connector includes a tubular member and a collar. A pair of diametrically opposed actuating arms depend from the collar and lie in a first plane. A pair of diametrically opposed locking arms depend from the collar and lie in a second plane that is orthogonal to the first plane. The locking arms are disposed to engage a lip on the end of a conduit and are movable between a locking position and an unlocking position in response to movement of the actuating arms.

9 Claims, 2 Drawing Sheets

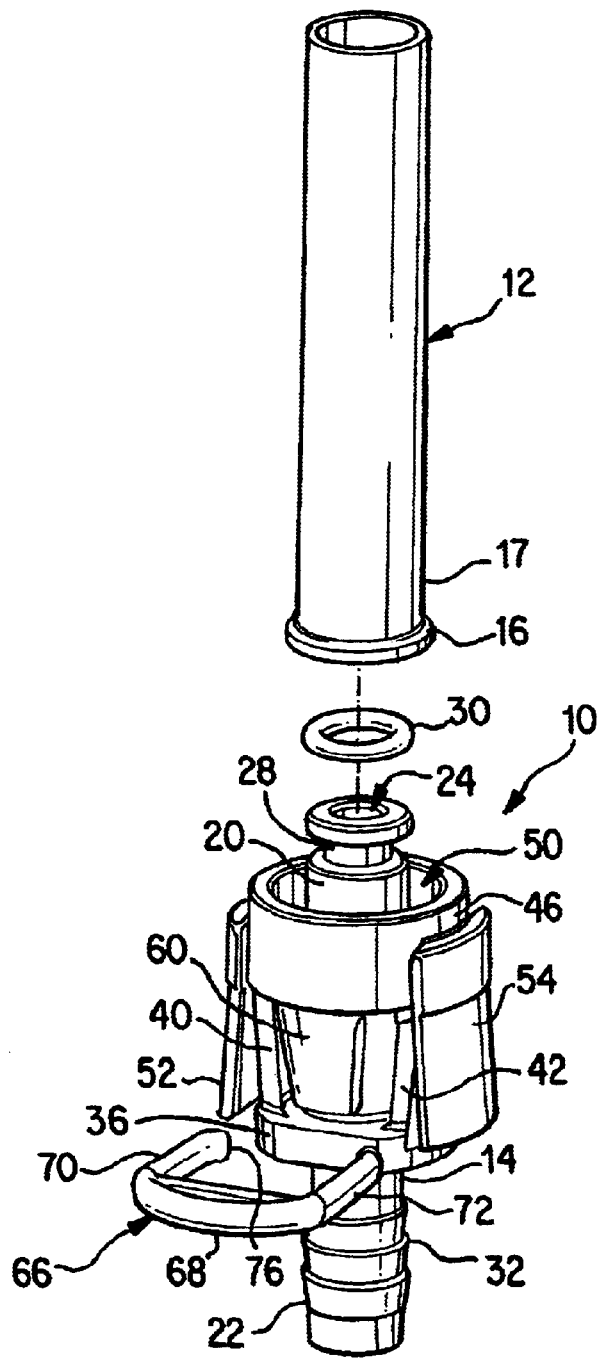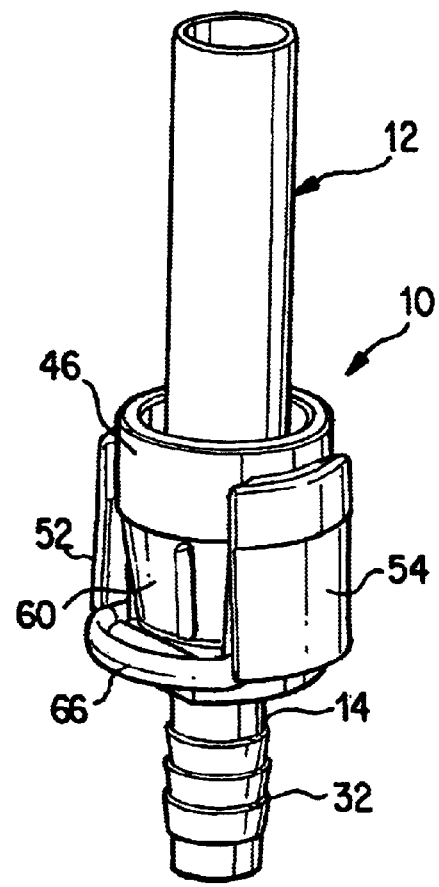
Fig. 1
Fig. 2

ONE PIECE QUICK CONNECTOR

The present invention is directed to connectors and particularly to connectors for coupling conduits together for the movement of conduits. More particularly, the invention relates to one-piece connectors, preferably connectors molded from plastic.

BACKGROUND AND SUMMARY OF THE INVENTION

Connectors for coupling fluid conduits are well known. For example, quick connectors have been used with compressed air equipment for years. However, compressed gas type connectors typically require two-handed operation, with one hand holding the hose and the other pulling a collar against a spring load to release a locking detent ball. Unfortunately, two handed operation in the cramped quarters found under most sinks is a decided disadvantage. Compressed gas type connectors can be operated with one hand, but single-handed operation requires a large and strong hand which, of course, not all installers possess.

According to the present invention, a quick connector comprises a tubular member and a collar coupled to the tubular member. The collar is disposed in spaced-apart relation with the tubular member and cooperates with the tubular member to form an annular opening for receiving a conduit. The collar retains the connector in position on the conduit.

The tubular member includes a radially extending flange and a pair of legs extending from the flange that connect the collar to the flange. The collar further includes a pair of locking arms and a pair of actuating arms. The locking arms move between a locking position and an unlocking position in response to movement of the actuating arms. The locking arms cooperate with the tubular member and the flange to retain the connector on the conduit.

The invention further provides a novel method of disconnecting a quick connector from a conduit. The method comprises the steps of providing a connector having a tubular member, a pair of actuating arms disposed in a first plane, and a pair of locking arms disposed in a second plane, with the first plane being orthogonal with the second plane, and squeezing the actuating arms together in the first plane.

Other features and advantages of the invention will become apparent from the following portion of this specification and from the accompanying drawings, which illustrate a presently preferred embodiment incorporating the principles of the invention.

BRIEF DESCRIPTION OF THE DRAWINGS

FIG. 1 is a perspective view of a quick connector according to the present invention in position to receive a conduit.

FIG. 2 is a perspective view of the quick connector of FIG. 1 coupled to the conduit.

DETAILED DESCRIPTION OF THE DRAWINGS

Figure 5:
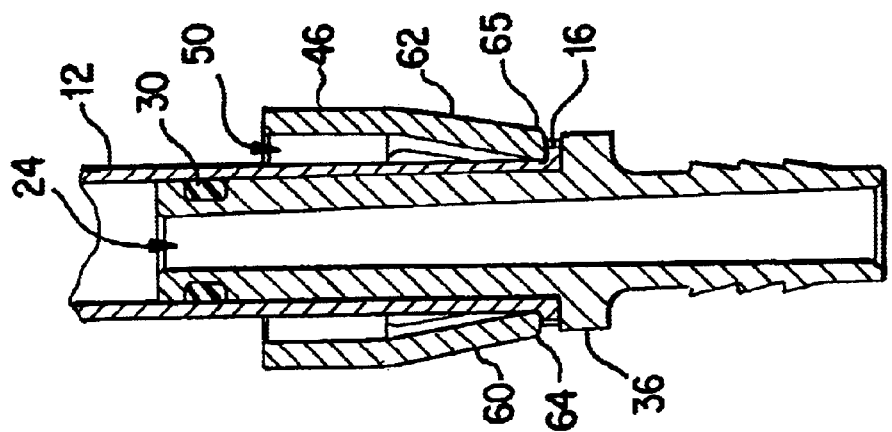
FIG. 5 is a section view taken along line 5–5 of FIG. 4.
Figure 4:
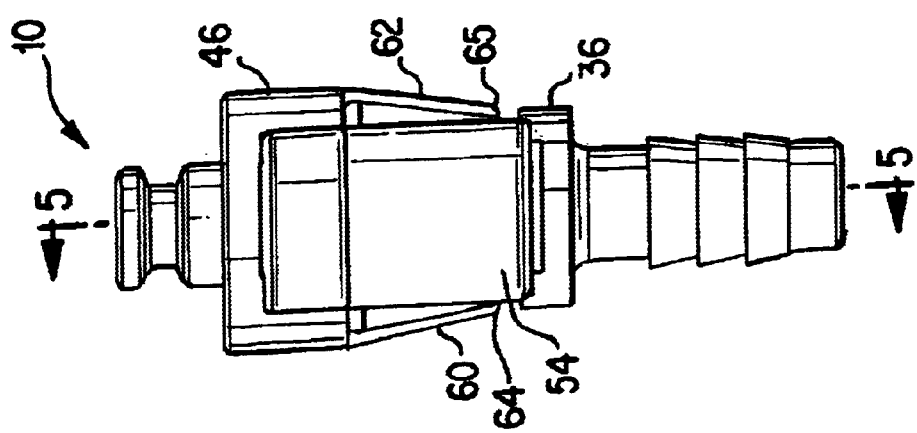
FIG. 4 is a side view of the quick connector of FIG. 1.
Figure 3:
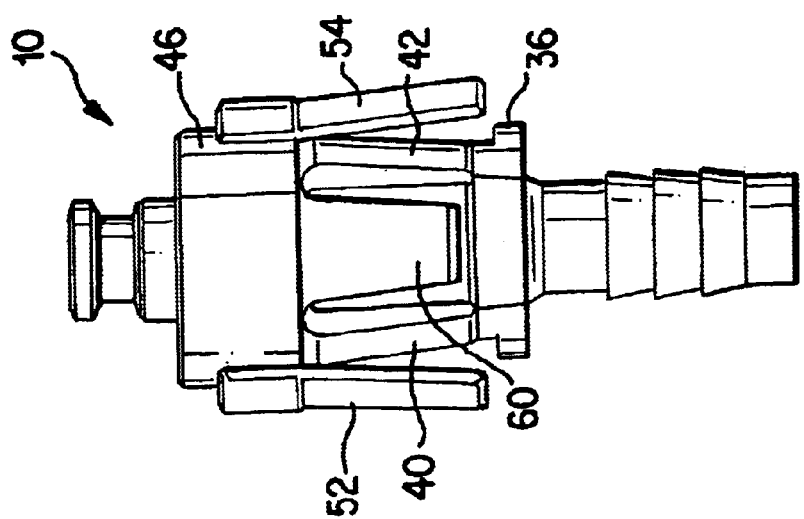
FIG. 3 is a front view of the quick connector of FIG. 1

A one-piece quick connector 10 according to the invention is illustrated in FIGS. 1–5. The connector 10 is configured to provide a quick and easy connection with a conduit 12. Preferably, the conduit 12 includes a radially outwardly extending lip 16 at the distal end 17 thereof. In preferred embodiments, the connector 10 is molded as a single unit from a plastic material.

The connector 10 includes a tubular member 14 having a first end 20, a second end 22, and a central longitudinal passage 24. The first end 20 includes an annular groove 28 configured to receive an o-ring 30. The second end 22 includes a plurality of annular barbs 32 for engaging a fluid conduit (not shown). A clamp (not shown) compresses the fluid conduit into the barbs to retain the conduit on the second end 22 in a conventional fashion. Alternatively, the second end can include a conventional male or female hose coupler in place of the annular barbs.

A flange 36 extends radially outwardly from the tubular member 14. Two diametrically opposed legs 40, 42 extend from the flange 36 toward the first end 20 in a space-apart relation with the tubular member 14. The legs 40, 42 support a collar 46 in parallel spaced-apart relation with the flange 36. The collar 46 cooperates with the tubular member 14 to provide an annular space 50 for receiving the conduit 12.

The collar 46 includes two pairs of diametrically opposed arms disposed along perpendicular diameters of the collar 46. The first pair of arms 52, 54 lie on the same diameter as the legs 40, 42 and depend from the outer surface of the collar 46. The arms 52, 54 are actuating arms and flare radially outwardly as they extend toward the second end 22. The second pair of arms 60, 62 depend from the lower edge of the collar 46 and flare radially inwardly as they extend toward the second end 22. The second pair of arms 60, 62 extend axially to position their distal ends 64, 65 near the flange 36. They are locking arms and extend radially inwardly so as to position their distal ends 64, 65 near the tubular member 14. Thus, the distal ends 64, 65 cooperate with the flange 36 and the tubular member 14 to define an L-shaped channel to receive the conduit 12 with the lip 16 disposed between the flange 36 and the distal ends 64, 65, as illustrated in FIG. 5. In use, the second end 20 of the quick connector 10 is inserted into the distal end 16 of the conduit 12, with the o-ring 30 providing a sealing engagement between the conduit 12 and the connector 10. As the connector 10 is inserted into the conduit 12, the lip 16 urges the second pair of arms 60, 62 radially outwardly. As the lip 16 passes the distal ends 64, 65, the second pair of arms 60, 62 move radially inwardly, positioning the lip 16 between the distal ends 64, 65 and the flange 36, thereby retaining the connector 10 on the conduit 12. In preferred embodiments, the arms 60, 62 are positioned to provide a snapping sound and feel when the lip 16 clears the distal ends 64, 65, thereby providing the installer a positive indication that the connector 10 is properly installed.

According to the present invention, the first pair of arms 52, 54 lie in a first plane, and the second pair of arms 60, 62 lie in a second plane that is orthogonal to the first plane. When the first pair of arms 52, 54 are squeezed together in an actuating movement, the second pair of arms 60, 62 are forced apart in an unlocking movement. As the arms 60, 62 move apart, the distal ends 64, 65 move away from the lip 16, releasing the connector 10 from the conduit 12.

The connector 10 further includes a lock 66 for retaining the first pair of arms 52, 54 in position and preventing them from moving inwardly towards the tubular member 14. The lock 66 includes a shoulder 68 and a pair of arms 70, 72 extending from the shoulder 68 to form a generally U-shaped member. The arms 70, 72 are separated from each other by a distance sufficient to embrace the legs 40, 42 therebetween. Each arm 70, 72 includes an inwardly directed finger 76 that serves as a retainer to keep the lock 66 from inadvertently sliding off the connector 10. In use, the lock 66 lies against the flange 36 with the arms 70, 72 disposed between an arm 52, 54 and a leg 40, 42, respectively, with the shoulder 68 and fingers 76 cooperating to retain the lock 66 in position.

The quick connector 10 is easy and inexpensive to manufacture and easy for a do-it-yourselfer to install. Advantageously, the design allows single-handed operation and provides for a positive indication of correct installation.

A one-piece quick connector has been described with respect to a presently preferred embodiment. However, it will be understood that various modifications can be made within the scope of the invention as claimed below.

I claim:

1. A quick connector comprising:

a tubular member; and a collar coupled to the tubular member and disposed in spaced-apart relation therewith, wherein the tubular member engages a conduit as a male member and the collar engages the conduit as a female member;

a pair of locking arms depending from the collar and disposed in a first plane and configured to engage the conduit to retain the tubular member on the conduit; and a pair of actuating arms depending from the collar and disposed in a second plane, the locking arms disengaging from the conduit in response to movement of the actuating arms.

2. The quick connector of claim 1 wherein the pair of locking arms are diametrically opposed and lie in the first plane and the pair of actuating arms are diametrically opposed and lie in the second plane, the first plane being orthogonal with the second plane.

3. The quick connector of claim 2 wherein the locking arms move in the first plane in response to movement of the actuating arms in the second plane.

4. The quick connector of claim 2 wherein the locking arms move in an unlocking direction in response to an actuating movement of the actuating arms.

5. The quick connector of claim 2 wherein the locking arms move between a locking position and an unlocking position in the first plane in response to movement of the actuating arms in the second plane.

6. The quick connector of claim 1 wherein the tubular member includes a flange extending radially outwardly therefrom and a pair of legs extending between the flange and the collar.

7. A quick connector comprising:

a tubular member; and a collar coupled to the tubular member and disposed in spaced-apart relation therewith, wherein the tubular member engages a conduit as a male member and the collar engages the conduit as a female member and the collar includes an annular member having an outer surface and a bottom edge, a pair of actuating arms depending from the outer surface, and a pair of locking arms depending from the bottom edge, the actuating arms flaring outwardly away from the tubular member and the locking arms flaring inwardly towards the tubular member, the locking arms moving in a first direction in response to movement of the actuating arms in a second direction.

8. A quick connector comprising:

a tubular member; and a collar coupled to the tubular member and disposed in spaced-apart relation therewith, wherein the tubular member engages a conduit as a male member and the collar engages the conduit as a female member and the collar includes an annular member having an outer surface and a bottom edge, a pair of actuating arms depending from the outer surface, and a pair of locking arms depending from the bottom edge, the actuating arms flaring outwardly away from the tubular member and the locking arms flaring inwardly towards the tubular member, wherein the actuating arms are diametrically opposed and lie in a first plane and the locking arms are diametrically opposed and lie in a second plane, the first plane being orthogonal with the second plane.

9. A quick connector comprising:

a tubular member including a flange and a conduit including a distal end having a lip, the locking arms cooperating with the tubular member and the flange to define an L-shaped channel for receiving the lip; and a collar coupled to the tubular member and disposed in spaced-apart relation therewith, the collar including a pair of actuating arms depending therefrom and a pair of locking arms depending therefrom, the pair of locking arms moving in a first direction in response to movement of the actuating arms in a second direction.

* * * * *